US012332465B2

(12) United States Patent
Zhong et al.

(10) Patent No.: US 12,332,465 B2
(45) Date of Patent: Jun. 17, 2025

(54) POLYMER-BASED NANOCOMPOSITE AND OPTICAL FILTER BASED THEREON

(71) Applicant: Zhijing Nanotech Co., LTD, Beijing (CN)

(72) Inventors: Haizheng Zhong, Beijing (CN); Xiaoxiu Zhu, Beijing (CN)

(73) Assignee: Zhijing Nanotech Co., LTD, Beijing (CN)

( * ) Notice: Subject to any disclaimer, the term of this patent is extended or adjusted under 35 U.S.C. 154(b) by 1025 days.

(21) Appl. No.: 17/065,465

(22) Filed: Oct. 7, 2020

(65) Prior Publication Data

US 2021/0018662 A1     Jan. 21, 2021

Related U.S. Application Data

(63) Continuation-in-part of application No. PCT/CN2019/079530, filed on Mar. 25, 2019.

(51) Int. Cl.
| | | |
|---|---|---|
| *G02B 5/22* | (2006.01) |
| *C08J 5/18* | (2006.01) |
| *C08K 5/00* | (2006.01) |
| *C08K 5/56* | (2006.01) |
| *B82Y 20/00* | (2011.01) |
| *B82Y 30/00* | (2011.01) |
| *B82Y 40/00* | (2011.01) |

(52) U.S. Cl.
CPC ............... *G02B 5/223* (2013.01); *C08J 5/18* (2013.01); *C08K 5/0041* (2013.01); *C08K 5/56* (2013.01); *B82Y 20/00* (2013.01); *B82Y 30/00* (2013.01); *B82Y 40/00* (2013.01); *C08J 2327/08* (2013.01); *C08J 2333/12* (2013.01); *C08K 2201/001* (2013.01); *C08K 2201/005* (2013.01); *C08K 2201/011* (2013.01); *G02B 2207/101* (2013.01)

(58) Field of Classification Search
CPC ......... G02B 5/223; C08J 5/18; C08J 2333/12; C08K 5/0041; C08K 2201/005; C08K 2201/011; B82Y 20/00; B82Y 30/00; B82Y 40/00
See application file for complete search history.

(56) References Cited

U.S. PATENT DOCUMENTS

| | | | |
|---|---|---|---|
| 10,424,696 B2 | 9/2019 | Foundation | |
| 2014/0319482 A1* | 10/2014 | Dobbertin | H10K 50/854 |
| | | | 257/40 |
| 2015/0090336 A1* | 4/2015 | Hong | H10K 30/353 |
| | | | 136/263 |
| 2016/0178816 A1 | 6/2016 | Corporation | |
| 2017/0331013 A1 | 11/2017 | Foundation | |
| 2018/0298278 A1* | 10/2018 | Zhong | C09K 11/025 |
| 2019/0330527 A1* | 10/2019 | Saidaminov | C09K 11/02 |
| 2020/0020834 A1 | 1/2020 | Foundation | |

FOREIGN PATENT DOCUMENTS

| | | |
|---|---|---|
| CN | 107109208 A | 8/2017 |
| CN | 107513166 A | 12/2017 |
| JP | 2015158612 A | 9/2015 |
| JP | 2018002712 A | 1/2018 |
| JP | 2018505542 A | 2/2018 |
| JP | 2018525671 A | 9/2018 |
| WO | 2015-012322 A1 | 1/2015 |
| WO | 2017-017441 A1 | 2/2017 |

OTHER PUBLICATIONS

Japanese Office Action, JP Application No. 2020-556308, Nov. 4, 2021, pp. 1-6.
European Search Report, EP Application No. 19785777.4, Jul. 12, 2021, pp. 1-13.
PCT International Search Report and Written Opinion (and English translations); PCT/CN2019/079530; Jun. 2, 20191.

* cited by examiner

*Primary Examiner* — Callie E Shosho
*Assistant Examiner* — Bethany M Miller
(74) *Attorney, Agent, or Firm* — Myers Bigel, P.A.

(57) ABSTRACT

The present disclosure discloses a polymer-based nanocomposite and an optical filter based thereon, wherein components of the polymer-based nanocomposite have a polymer matrix and a semiconductor material; and the polymer-based nanocomposite has an average light transmittance of greater than 90% in at least one light-transmitting wavelength range and a light transmittance of less than 1% in at least one cut-off wavelength range, wherein the semiconductor material is a non-radiative recombination-type perovskite material.

10 Claims, 6 Drawing Sheets

POLYMER-BASED NANOCOMPOSITE AND OPTICAL FILTER BASED THEREON

CROSS-REFERENCE TO RELATED APPLICATION

This disclosure is an application via Bypass Continuation Route on the basis of the PCT application PCT/CN2019/079530 claiming the priority of Chinese Patent Application No. CN2018103096216. These applications are incorporated herein in their entirety by reference.

TECHNICAL FIELD

The present disclosure relates to a polymer-based nanocomposite and an optical filter based thereon, and belongs to the fields of materials and optical filters.

BACKGROUND ART

Optical filters may be divided into absorption-type optical filters and interference-type optical filters according to the principle of optical filtering. An absorption-type optical filter filters light by utilizing the selectivity of a substance for light. An absorption-type long-wave-pass optical filter typically uses organic dye molecules dispersed in glass. Although this kind of optical filter has stable spectral characteristics, low price, and simple process, it has the disadvantages of large thickness, small cut-off steepness, low peak transmittance, no continuous adjustability of wavelength, and the like. Current commercial optical filters are mainly interference-type optical filters. This kind of optical filter is a plurality of dielectric films, which are alternately formed by a vacuum deposition method and have certain thicknesses and a change in refractive index, and has the advantages of large cut-off steepness, high transmittance at long wavebands, and the ability to produce an optical filter having continuous adjustability of wavelength. However, ultraviolet optical filters have low transmittance, the susceptibility to temperature and humidity, high production cost, the difficulty in integration, and high defect rate of products.

SUMMARY OF THE INVENTION

According to one aspect of the present disclosure, there is provided a polymer-based nanocomposite.

Components of the polymer-based nanocomposite comprise a polymer matrix and a semiconductor material; and
the polymer-based nanocomposite has an average light transmittance of greater than 90% in at least one light-transmitting wavelength range and a light transmittance of less than 1% in at least one cut-off wavelength range, wherein the semiconductor material is a non-radiative recombination-type perovskite material.

Optionally, the polymer-based nanocomposite has an average light transmittance of greater than 90% in at least one light-transmitting wavelength range and a light transmittance of less than 1% in at least one cut-off wavelength range in a range of 3000-200 nm.

Optionally, a polymer of the polymer matrix is selected from at least one of polyvinylidene fluoride, polymethyl methacrylate (PMMA), polyvinyl chloride (PVC), polyvinyl alcohol (PVA), transparent ABS plastics (ABS), polyacrylonitrile (PAN), polyolefin elastomer (POE), thermoplastic polyurethane (TPU), polyvinylcarbazole (PVK), polyvinylidene chloride (PVDc), polyvinyl acetate (PVAc), cellulose acetate (CA), polysulfone (PSF), polyamide (PA), polyimide (PI), polycarbonate (PC), and polystyrene (PS).

Optionally, the semiconductor material is selected from at least one of general chemical formulae of $A_3B_2X_9$, $ABX_3$, and $A_2BX_6$;
wherein A is selected from at least one of $CH_3NH_3$, $CH(NH)NH_3$, and Cs; B is selected from at least one of Ag, Sb, Bi, In, Al, Ti, and Sn; and X is selected from at least one of halogen elements;
the semiconductor material has a solid content of 2 wt %-50 wt %; and
the semiconductor material has a size of 2-100 nm.

Optionally, the polymer-based nanocomposite further comprises an additive component;
the additive component is selected from at least one of poly(p-phenylenevinylene) (MEH-PPV), poly(3-hexylthiophene) (P3HT), [6,6]-phenyl C61 butyric acid methyl ester (PC61BM), polyvinylcarbazole (PKV), perylene diimide (BDI), fullerene, and poly[2-methoxy-5-(3,7-dimethyloctyloxy) phenylenevinylene-1,4-diyl] (MDMO-PPV);
the additive component in the polymer-based nanocomposite has a content of 1 wt %-20 wt %.

According to yet another aspect of the present disclosure, there is provided an optical filter based on any one of the polymer-based nanocomposite described above.

Production steps of the optical filter comprise at least:
a) dissolving a polymer matrix and a precursor of a semiconductor material in organic solvents, respectively, to obtain a polymer gum solution and a precursor solution;
b) adding the precursor solution to the polymer gum solution followed by uniformly mixing, to obtain a mixed solution;
c) coating the mixed solution obtained in step b) on a substrate, to form a film with a wet film thickness of 50-1000 µm; and
d) subjecting the substrate coated with a wet film to drying treatment followed by heat treatment at 20-100° C. for 0.17-1 hour, to obtain the optical filter.

Optionally, the organic solvent in step a) is selected from at least one of N,N-dimethylformamide (DMF), dimethylacetamide (DMAc), dimethyl sulfoxide (DMSO), ethyl acetate (EtAc), N-methylpyrrolidone (NMP), tetrahydrofuran (THF), toluene, and chloroform, acetone;
the precursor in step a) comprises a precursor I and a precursor II, wherein the precursor I is selected from at least one of methylamine halide, formamidine halide, and cesium halide, the precursor II is selected from at least one of bismuth halide, indium halide, antimony halide, silver halide, and titanium halide, and a molar mixing ratio of the precursor I to the precursor II is in a range of 1:2-3:1;
the substrate in step c) is selected from any of a glass plate and PET; and
the heat treatment in step d) is annealing.

Optionally, the optical filter is a long-wave-pass optical filter or a double-wave-pass optical filter;
the long-wave-pass optical filter has an optical filtering waveband range in a range of 3000 nm-250 nm;
the double-wave-pass optical filter has an optical filtering waveband range including two non-overlapping waveband ranges in a range of 3000 nm-250 nm; and
the long-wave-pass optical filter and the double-wave-pass optical filter have a light transmittance in a range of 80%-92% in a light-transmitting waveband range.

According to yet another aspect of the present disclosure, there is provided a narrowband optical filter, characterized by comprising at least one of the optical filters based on the polymer-based nanocomposite described above, wherein the narrowband optical filter has an optical filtering waveband range in a range of 3000 nm-250 nm and a light transmittance in a range of 80%-92% in a light-transmitting waveband range.

Optionally, the narrowband optical filter further comprises at least one of a short-wave-pass optical filter and a dye-doped polymer.

DESCRIPTION OF EMBODIMENTS

Figure 1:
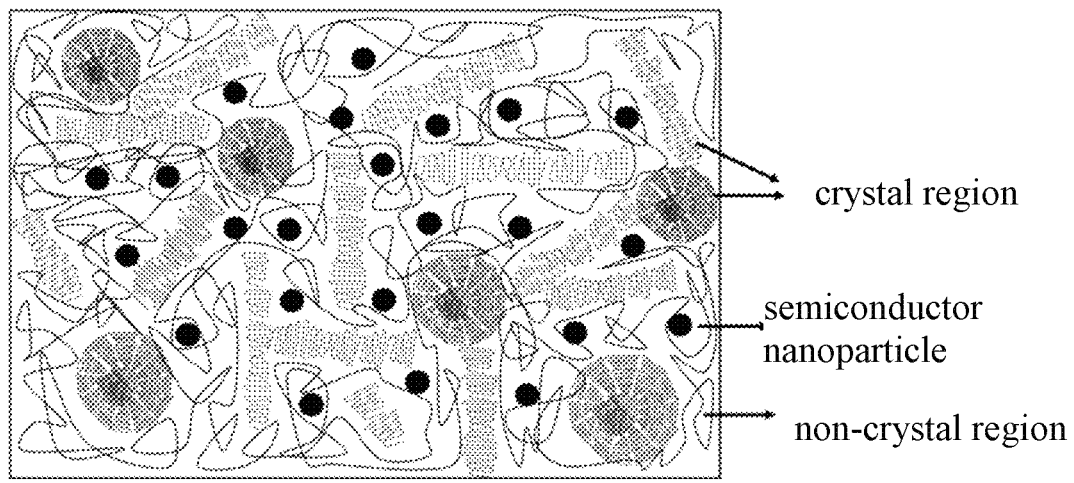
FIG. 1 is a structural schematic diagram of specific existing forms of substances in a polymer-based nanocomposite optical filter in an embodiment of the present disclosure.

In a specific embodiment of the present disclosure, the polymer-based nanocomposite is composed of a transparent polymer matrix and a non-radiative recombination-type semiconductor material, both of which are present in the specific form as shown in FIG. 1. Semiconductor nanoparticles are separated by crystal regions of the polymer matrix and chain segments of the polymer, or, semiconductor nanoparticles are directly separated by chain segments of the polymer, and semiconductor particles are overcoated by molecular chain segments, so that a good water-oxygen barrier function is achieved. Here, the semiconductor has a solid content (the weight of the entire dry film occupied by the semiconductor) of 2 wt %-50 wt %.

It is found surprisingly that the polymer-based nanocomposite containing the non-radiative recombination-type semiconductor material of the present disclosure will not emit light having a lower or higher frequency, since radiative recombination does not occur in the nanocomposite upon the nanocomposite absorbs the excitation light. The nanocomposite may filter off the incident light in a certain range of wavelength, without influencing transmission of light in other wave band. Therefore, the non-radiative recombination-type semiconductor material of the present disclosure may be used in optical filters. In contrast, a radiative recombination-type semiconductor material will emit light at another wave band while absorbing light in one wave band. Thus, the phenomenon of increase of the incident light may occur in the light-transmitting wave band. Therefore, although the radiative recombination-type semiconductor material may be used as a material for converting the frequency of a light, it is not appropriate for an optical filter.

In the present disclosure, the solid content of the semiconductor material refers to the weight percentage of the weight of the entire polymer-based nanocomposite dry film occupied by the semiconductor.

Figure 2:
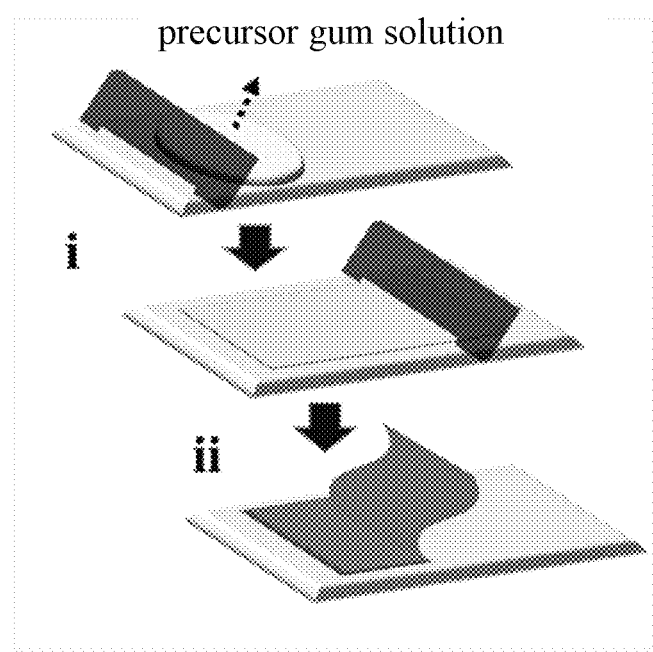
FIG. 2 is a production flowchart of a polymer-based nanocomposite optical filter in an embodiment of the present disclosure.

In the present disclosure, the polymer-based nanocomposite is obtained by in situ production, as shown in FIG. 2.

In the present disclosure, semiconductor material may absorb light having a wavelength greater than that to which its band gap corresponds. Certain semiconductor materials, particularly perovskite materials, have the characteristics of large absorption coefficients and steep absorption edges. Continuous adjustment of transmission wavelength may be achieved by adjusting the solid content of the semiconductor material and by controlling the size, the film thickness, and the type of the semiconductor material, and further, single-waveband or double-waveband high transmission may be achieved if an appropriate size is controlled. If its particle size is controlled to be around a corresponding exciton Bohr radius, relatively strong exciton absorption will be present in the semiconductor material, so that double-waveband transmission is achieved.

The optical filter based on the polymer-based nanocomposite in the present disclosure belongs to absorption-type optical filters, and aims to overcome the disadvantages of current absorption-type optical filters, such as small cut-off steepness, low peak transmittance, no continuous adjustability of wavelength, and large film thickness. Additionally, compared to current commercial interference-type optical filters, the semiconductor/polymer composite thin film optical filter provided by the present disclosure overcomes the disadvantages of the optical filters, including the susceptibility to temperature and humidity, high production cost, the difficulty in integration, and high defect rate of products.

The effective transmission region of the polymer-based nanocomposite of the present disclosure may extend to the absorption limit of the polymer matrix.

Optionally, the production method of the polymer-based nanocomposite comprises: dissolving a polymer matrix and a precursor of a semiconductor material in organic solvents, respectively, to obtain a polymer gum solution and a precursor solution; and casting and drying to obtain the polymer-based nanocomposite.

Optionally, the production method of the polymer-based nanocomposite comprises: dissolving a polymer matrix and a precursor of a semiconductor material in organic solvents, respectively, to obtain a polymer gum solution and a precursor solution, and adding an additive component; and casting and drying to obtain the polymer-based nanocomposite.

Optionally, a light-absorbing material such as a dye and the like is added to a polymer-based nanocomposite optical filter, so as to achieve narrowband detection. Narrowband detection may also be achieved by combining a polymer-based semiconductor nanocomposite optical filter with a corresponding short-wave-pass optical filter or another layer of dye/polymer composite thin film optical filter. The dye may be MEH-PPV, P3HT, PC61BM, PVK, BDI, fullerene, MDMO-PPV, and the like.

In the present disclosure, in the dye-doped polymer, the dye is selected from at least one of MEH-PPV, P3HT, PC61BM, PVK, BDI, fullerene, MDMO-PPV, and the like, the polymer is selected from at least one of polyvinylidene fluoride, polymethyl methacrylate, polyvinyl acetate, cellulose acetate, polysulfone, polyamide, polyimide, polycarbonate, polystyrene, polyvinyl chloride, polyvinyl alcohol, transparent ABS plastics, polyacrylonitrile, polyolefin elastomers, thermoplastic polyurethane, and polyvinyl carbazole. In the present disclosure, the doping amount of the dye in the polymer may be 1 wt %-20 wt %.

Optical filters of the present disclosure have the advantages of large cut-off steepness, high peak transmittance (>90%), and good cut-off depth, and continuous adjustment of transmission wavelength and the intensity of transmission light may be achieved. It is obtained by in situ production, and has simple production process, low requirement for equipment, low price of raw materials, low production cost, good stability, small thickness (20 µm), and good flexibility. This is favorable to the achievement of lightweighting, downsizing, and flexible processing of devices and facilitates integration.

Optionally, the narrowband optical filter employs the optical filter based on the polymer-based nanocomposite described above, and the optical filter based on the polymer-based nanocomposite is combined with a short-wave-pass optical filter or dye molecules of an added dye molecule additive, to achieve narrowband optical filtering.

In the present disclosure, monochromatic or bichromatic narrowband optical filtering may be achieved by the narrowband optical filter obtained by combining at least one of the short-wave-pass optical filter and the dye additive with any one of the optical filters described above.

The advantageous effects brought about by the present disclosure include the followings.

1) The thin film of the polymer-based nanocomposite provided by the present disclosure has an absorbance of nearly 0 and a transmittance of about 95% in a very long waveband range, and has the advantages of good weather resistance and good resistance to chemical reagents, and is an excellent matrix material for absorption-type optical filters.

2) The optical filter based on the polymer-based nanocomposite provided by the present disclosure has the advantages of large cut-off steepness, high peak transmittance (>90%), and good cut-off depth.

3) The optical filter based on the polymer-based nanocomposite provided by the present disclosure may achieve single-waveband or double-waveband high transmission and may achieve continuous adjustment of transmission wavelength and the intensity of transmission light.

4) The optical filter based on the polymer-based nanocomposite provided by the present disclosure is obtained by in situ production, and has simple production process, low requirement for equipment, low price of raw materials, low production cost.

5) The optical filter based on the polymer-based nanocomposite provided by the present disclosure has good stability, small thickness (20 µm), and good flexibility, and this is favorable to the achievement of lightweighting, downsizing, and flexible processing of devices and facilitates integration.

6) The optical filter based on the polymer-based nanocomposite provided by the present disclosure may be combined with a suitable short-wave-pass type optical filter or a dye-doped polymer thin film to achieve monochromatic or bichromatic narrowband optical filtering.

The present disclosure will be described in detail below in conjunction with Examples, but the present disclosure is not limited to these Examples.

Unless particularly indicated, raw materials such as polymers, dye additives, and precursors in Examples of the present disclosure were all commercially purchased, wherein the precursors were all purchased from Aladdin Co., Ltd., the dyes were all purchased from Xi'an p-OLED Co., Ltd., and the polymers were purchased from Bayer Co., Ltd., Germany.

Analytical methods in Examples of the present disclosure were as follows.

Morphologies and structures of polymer-based nanocomposites were characterized by using a D/max X-ray diffractometer from Rigaku, Japan, and an S-4800 scanning electron microscope from Hitachi.

The relationship of the variation of the light transmittance with the wavelength for optical filters was analyzed by using a UV-3600 ultraviolet-visible light spectrophotometer from Shimadzu.

The above tests were all performed at room temperature.

The sizes of the semiconductor materials in the composites in the Examples were in a range of 2-100 nm.

Example 1 Production of Polymer-Based Nanocomposite

Production of Sample $MA_3Bi_2Br_9$/Polymer (PMMA)

A polymer (PMMA) was dissolved in DMF to obtain a clear and transparent polymer gum solution. A precursor I, which was MABr (methylamine bromide), and a precursor II, which was $BiBr_3$, were dissolved in DMF at a molar ratio of 3:2 to obtain a precursor solution. The precursor solution was added to the polymer gum solution in such an addition amount that the solid content was 50 wt %, followed by uniformly mixing, and a sample $1^\#$ $MA_3Bi_2Br_9$/polymer was obtained by casting and drying.

Samples $2^\#$, $3^\#$, $4^\#$, and $5^\#$ $MA_3Bi_2Br_9$/polymer were obtained under the same conditions except that the solid content was changed to 10 wt %, 20 wt %, 30 wt %, 40 wt %, respectively.

Production of Sample $MA_3In_2Cl_9$/Polymer (PVDc)

The production process of the sample $MA_3In_2Cl_9$/polymer was similar to the production process of the sample $MA_3Bi_2Br_9$/polymer except that the polymer was replaced by PVDc, the precursor I was replaced by MACl, the precursor II was replaced by $InCl_3$, and the solid content was changed to 3 wt %, so as to obtain a sample $6^\#$ $MA_3In_2Cl_9$/polymer.

Production of Sample $MA_3In_2Cl_9$/Polymer (PMMA)

The production process of the sample $MA_3In_2Cl_9$/polymer (PMMA) was similar to the production process of the sample $MA_3In_2Cl_9$/polymer (PVDc) except that the polymer (PVDc) was replaced by a polymer (PMMA) and the solvent was replaced by THE, so as to obtain a sample $7^\#$ $MA_3In_2Cl_9$/polymer.

Other samples were produced by similar production processes, and specific sample numbers and production conditions were as shown in Table 1.

TABLE 1

| Sample No. | Raw material (molar ratio of polymer/precursor/precursor) | Solid content (wt %) | Solvent |
|---|---|---|---|
| Sample $8^\#$ | $PVDF/(MAI, BiI_3)/MAI:BiI_3 = 1:1$ | 2 | DMF |
| Sample $9^\#$ | $ABS/(MABr, SbBr_3)/MABr:SbBr_3 = 2:1$ | 15 | DMSO |
| Sample $10^\#$ | $CA/(CsBr, SbBr_3)/CsBr:SbBr_3 = 1.5:1$ | 25 | NMP |
| Sample $11^\#$ | $PVAc/(CsBr, AgBr, BiBr_3)/CsBr, AgBr, BiBr_3 = 1:0.5:0.5$ | 10 | DMF |
| Sample $12^\#$ | $PVDc/(FABr, BiBr_3)/FABr:BiBr_3 = 1.5:1$ | 20 | DMAc |
| Sample $13^\#$ | $PAN/(CsI, SnI_4)/CsI:SnI_4 = 2:1$ | 20 | DMF |

Here, FABr is formamidine bromide.

Example 2 Production of Long-Wave-Pass Optical Filters $C1^\#$-$C5^\#$ Based on the Sample $1^\#$ $MA_3Bi_2Br_9$/Polymer A glass plate was used as a substrate and the surface of the glass plate was cleaned, and a mixed solution, in which the sample $1^\#$ $MA_3Bi_2Br_9$/polymer (PMMA) was well dissolved, was coated on the glass plate; a wet film having a thickness of 200 μm (corresponding to a dry film thickness of about 20 μm) was formed by wiping with a film wiper; and the glass plate coated with the wet film was placed in a vacuum drying oven for vacuum drying at 50° C., followed by annealing at 80° C. for 30 min after drying was complete, to obtain a long-wave-pass optical filter $C1^\#$ based on $MA_3Bi_2Br_9$/polymer.

Figure 3:
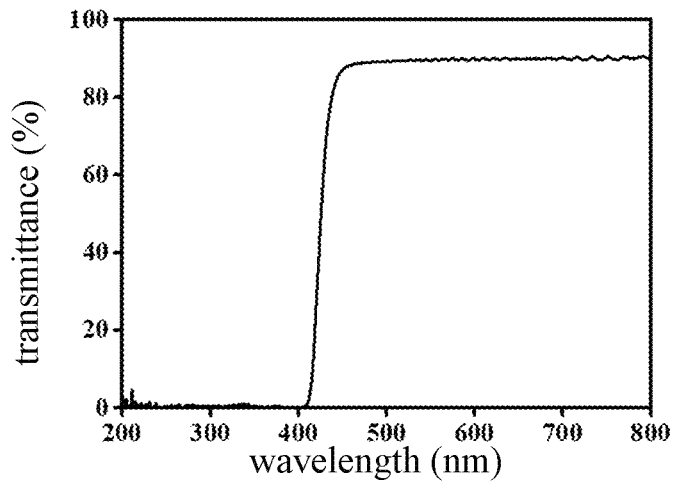
FIG. 3 is a graph of the relationship of the variation of the transmittance with the wavelength for a long-wave-pass optical filter C1[#] based on a sample 1[#] $MA_3Bi_2Br_9$/polymer in Example 2 of the present disclosure.
Figure 14:
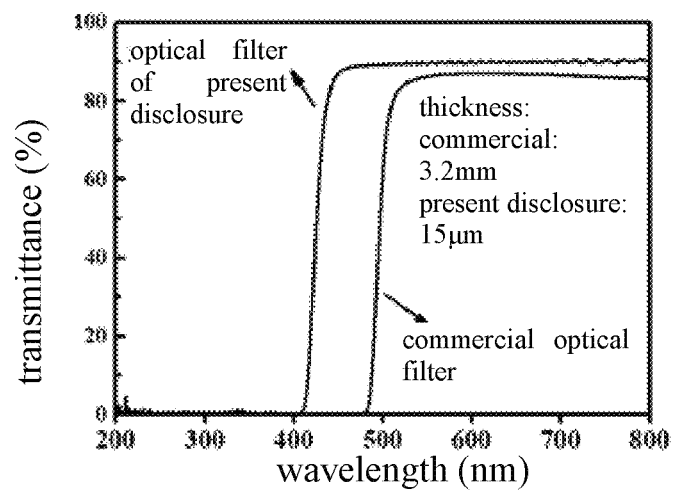
FIG. 14 is a comparative graph of the relationship of the variation of the transmittance with the wavelength for a C1[#] narrowband single-wave-pass optical filter in the present disclosure and a commercial glass optical filter.

The relationship of the variation of the transmittance with the wavelength for this optical filter is as shown in FIG. 3. As can be known from FIG. 3, this optical filter has a transmittance of >90%, a light transmittance of less than 1% in the cut-off wavelength range, and a large cut-off steepness, in a wavelength range of greater than 420 nm. The comparative graph of the relationship of the variation of the transmittance with the wavelength for this optical filter and a commercial glass optical filter is as shown in FIG. 14. As can be known from FIG. 14, this optical filter has a transmission region with an average transmittance of 91%, which is higher than that of the commercial glass optical filter (85%); this optical filter has a thickness of 15 μm, which is far smaller than that of the commercial glass optical filter (3.2 mm); and this optical filter has a cut-off steepness slightly better than that of the commercial glass optical filter.

The same steps in the method described above were performed except that the wet film thickness wiped by the film wiper was changed to 50 μm, to obtain a long-wave-pass optical filter $C2^\#$ based on $MA_3Bi_2Br_9$/polymer.

The same steps in the method described above were performed except that the wet film thickness wiped by the film wiper was changed to 1000 μm, to obtain a long-wave-pass optical filter $C3^\#$ based on $MA_3Bi_2Br_9$/polymer.

The same steps in the method described above were performed except that the conditions of annealing was changed to annealing at 20° C. for 1 hour, to obtain a long-wave-pass optical filter $C4^\#$ based on $MA_3Bi_2Br_9$/polymer.

The same steps in the method described above were performed except that the conditions of annealing was changed to annealing at 100° C. for 0.17 hours, to obtain a long-wave-pass optical filter $C5^\#$ based on $MA_3Bi_2Br_9$/polymer.

Example 3 Production of Double-Wave-Pass Optical Filter Based on the Sample $6^\#$ $MA_3In_2Cl_9$/Polymer A glass plate was used as a substrate and the surface of the glass plate was cleaned, and a mixed solution, in which the sample $6^\#$ $MA_3In_2Cl_9$/polymer (PVDc) was well dissolved, was coated on the glass plate; a wet film having a thickness of 200 μm (corresponding to a dry film thickness of about 20 μm) was formed by wiping with a film wiper; and the glass plate coated with the wet film was placed in a vacuum drying oven for vacuum drying at 60° C., followed by annealing at 80° C. for 30 min after drying was complete, to obtain a long-wave-pass optical filter based on $MA_3In_2Cl_9$/polymer, which was denoted by $6^\#$.

Figure 4:
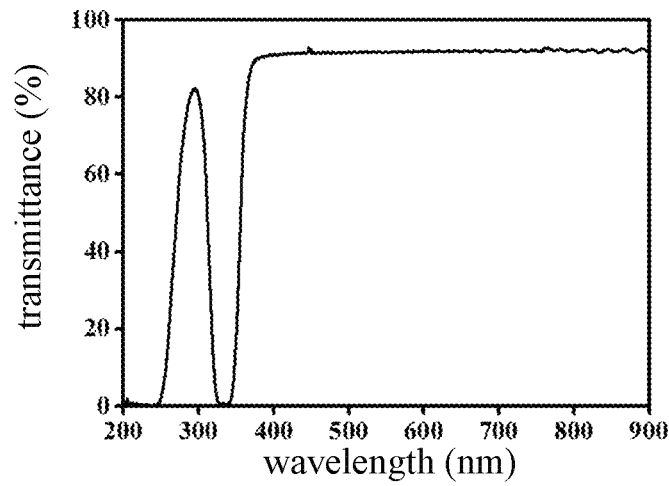
FIG. 4 is a graph of the relationship of the variation of the transmittance with the wavelength for a double-wave-pass optical filter based on a sample 6[#] $MA_3In_2Cl_9$/polymer in Example 3 of the present disclosure.

The relationship of the variation of the transmittance with the wavelength for this optical filter is as shown in FIG. 4. As can be known from FIG. 4, this optical filter has relatively high transmittances, a light transmittance of less than 1% in the cut-off wavelength range, and a relatively large cut-off steepness, in ranges of 250-320 nm and greater than 345 nm, wherein the peak transmittance in a range of 250-320 nm was about 82% and the transmittance in a range of greater than 345 nm was about >91%.

Example 4 Production of Narrowband Optical Filter $Z1^\#$ Based on $MA_3Bi_2Br_9$/Polymer A narrowband optical filter having a center wavelength of 440 nm was obtained by combining the long-wave-pass optical filter based on $MA_3Bi_2Br_9$/polymer (PMMA) in Example 2 with a commercial 450 nm short-wave-pass optical filter, and specific operations were as follows.

A commercial 450 nm short-wave-pass optical filter was used as a substrate and the surface of the commercial 450 nm short-wave-pass optical filter was cleaned, and a mixed solution, in which the sample 1# $MA_3Bi_2Br_9$/polymer was well dissolved, was coated on the commercial 450 nm short-wave-pass optical filter; a wet film having a thickness of 200 μm (corresponding to a dry film thickness of about 20 μm) was formed by wiping with a film wiper; and the commercial 450 nm short-wave-pass optical filter coated with the wet film was placed in a vacuum drying oven for vacuum drying at 50° C., followed by annealing at 80° C. for 30 min after drying was complete, to obtain a combined narrowband optical filter, which was denoted by Z1#.

Figure 5:
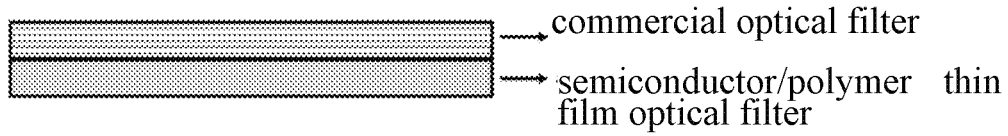
FIG. 5 is a structural schematic diagram of the combination of an optical filter based on a polymer-based nanocomposite and a commercial short-wave-pass type optical filter in an embodiment of the present disclosure.
Figure 7:
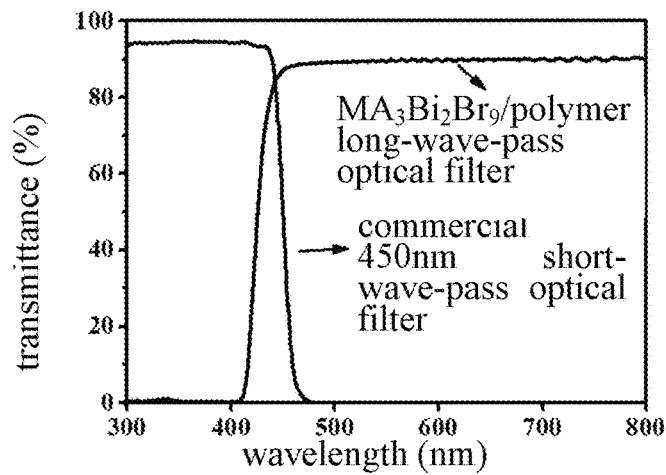
FIG. 7 is a graph of the relationship of the variation of the transmittance with the wavelength for a narrowband optical filter obtained by combining a long-wave-pass optical filter based on a sample 1[#] $MA_3Bi_2Br_9$/polymer with a commercial 450 nm short-wave-pass single-wave-pass optical filter in Example 4 of the present disclosure.

The structure of this narrowband optical filter is as shown in FIG. 5, and the relationship of the variation of the transmittance with the wavelength is as shown in FIG. 7. This narrowband optical filter has a peak transmittance of >84%, a light transmittance of less than 1% in the cut-off wavelength range, and a half band width of 28 nm.

Example 5 Production of Narrowband Optical Filter Z2# Based on $MA_3Bi_2Br_9$/Polymer A narrowband optical filter was obtained by combining the long-wave-pass optical filter based on $MA_3Bi_2Br_9$/polymer (PMMA) in Example 2 with an MDMO-PPV/polymer optical filter, and specific operations were as follows.

MDMO-PPV and a polymer (PVDF) were mixed and dissolved in toluene at such a ratio that the solid content of was 10%, to obtain a clear dye/polymer mixed solution.

The mixed solution described above was coated on the long-wave-pass optical filter based on $MA_3Bi_2Br_9$/polymer in Example 2, and a wet film having a thickness of 200 μm was formed by wiping with a film wiper.

Figure 6:
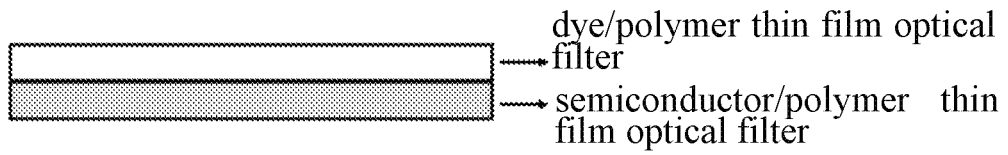
FIG. 6 is a structural schematic diagram of the combination of an optical filter based on a polymer-based nanocomposite and a polymer-based dye composite optical filter in an embodiment of the present disclosure.

The wet film described above was placed in a vacuum drying oven for vacuum drying at 30° C. until the film was completely dried to obtain a combined narrowband optical filter, which was denoted by Z2→. The structure of this optical filter is as shown in FIG. 6.

Example 6 Narrowband Single-Wave-Pass Optical Filter ZD1# Based on $MA_3In_2Cl_9$/Polymer A narrowband single-wave-pass optical filter, which was denoted by ZD1#, was obtained by combining the double-wave-pass optical filter based on the sample 6# $MA_3In_2Cl_9$/polymer (PVDc) with a commercial 300 nm short-wave-pass optical filter, and the specific process was as follows.

Figure 8:
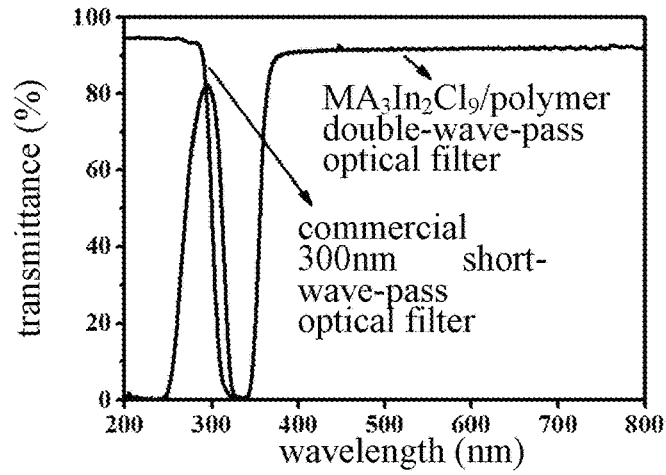
FIG. 8 is a graph of the relationship of the variation of the transmittance with the wavelength for a narrowband optical filter obtained by combining a double-wave-pass optical filter based on a sample 6[#] $MA_3In_2Cl_9$/polymer with a commercial 300 nm short-wave-pass single-wave-pass optical filter in Example 6 of the present disclosure.

The steps were maintained to be unchanged except that the substrate in Example 3 was changed to a commercial 300 nm short-wave-pass optical filter. The structure of this optical filter is as shown in FIG. 5, and the relationship of the variation of the transmittance with the wavelength is as shown in FIG. 8. As can be known from FIG. 8, the single-wave-pass narrowband optical filter obtained has a peak transmittance of 82%, a light transmittance of less than 1% in the cut-off wavelength range, and a half band width of 33 nm.

Example 7 Narrowband Double-Wave-Pass Optical Filter ZS1# Based on $MA_3In_2Cl_9$/Polymer A narrowband double-wave-pass optical filter, which was denoted by ZS1#, was obtained by combining the double-wave-pass optical filter based on the sample 6# $MA_3In_2Cl_9$/polymer (PVDc) with a commercial 375 nm short-wave-pass optical filter, and the specific process was as follows.

Figure 9:
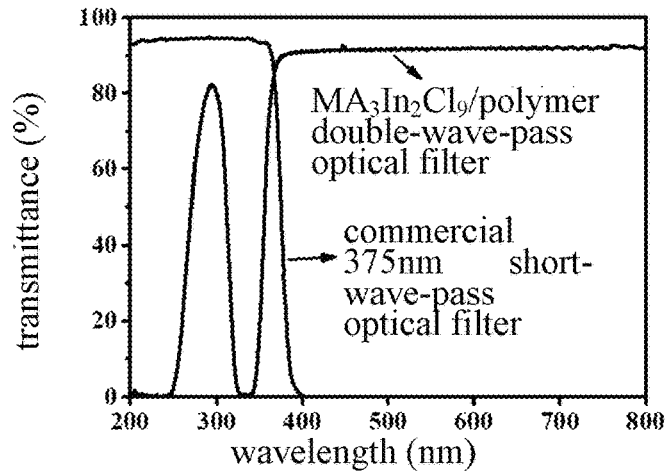
FIG. 9 is a graph of the relationship of the variation of the transmittance with the wavelength for a narrowband optical filter obtained by combining a double-wave-pass optical filter based on a sample 6[#] $MA_3In_2Cl_9$/polymer with a commercial 375 nm short-wave-pass single-wave-pass optical filter in Example 7 of the present disclosure.

The steps were maintained to be unchanged except that the substrate in Example 3 was changed to a commercial 375 nm short-wave-pass optical filter. The structure of this optical filter is as shown in FIG. 5, and the relationship of the variation of the transmittance with the wavelength is as shown in FIG. 9. As can be known from FIG. 9, the narrowband double-wave-pass optical filter obtained has a peak transmittance of 82%, a light transmittance of less than 1% in the cut-off wavelength range, and a half band width of 45 nm, in a range of 250-320 nm, a peak transmittance of 86%, a light transmittance of less than 1% in the cut-off wavelength range, and a half band width of 20 nm, in a range of 345-388 nm.

Example 8 Narrowband Single-Wave-Pass Optical Filter Z3# Based on $MA_3In_2Cl_9$/Polymer A narrowband optical filter was obtained by combining the double-wave-pass optical filter based on the sample 6# $MA_3In_2Cl_9$/polymer (PVDc) with a P3HT/polymer optical filter, and the specific process was as follows.

A dye P3HT and a polymer were mixed and dissolved in toluene at such a ratio that the solid content of was 10 wt. %, to obtain a clear P3HT/polymer gum solution. The gum solution described above was coated on the double-wave-pass optical filter based on $MA_3In_2Cl_9$/polymer in Example 3, and a wet film having a thickness of 200 μm was formed by wiping with a film wiper. The wet film described above was placed in a vacuum drying oven for vacuum drying at 30° C. until the film was completely dried, to obtain a narrowband optical filter, which was denoted by Z3# optical filter.

Figure 10:
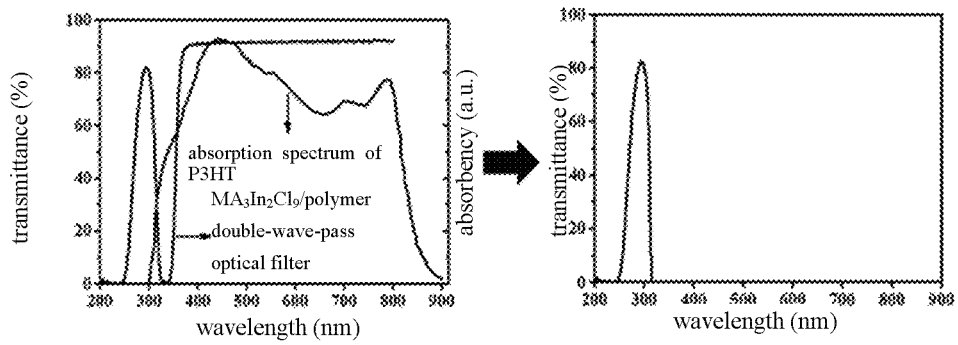
FIG. 10 is a graph of the relationship of the variation of the transmittance with the wavelength for a narrowband optical filter obtained by combining a sample $MA_3In_2Cl_9$/polymer double-wave-pass optical filter with a P3HT/polymer optical filter in Example 8 of the present disclosure.
Figure 13:
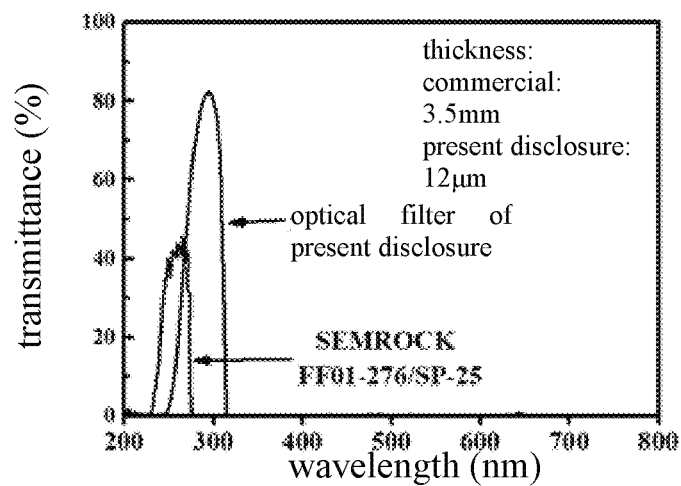
FIG. 13 is a comparative graph of the relationship of the variation of the transmittance with the wavelength for a Z3[#] long-wave-pass optical filter in the present disclosure and a commercial interference-type optical filter, SEMROCK-FF01-276/SP-25 optical filter.

The structure of this optical filter is as shown in FIG. 6, and the relationship of the variation of the transmittance with the wavelength is as shown in FIG. 10. This optical filter has a peak transmittance of >82% and a half band width of 43 nm, in a range of 250-315 nm. The comparative graph of the relationship of the variation of the transmittance with the wavelength for this optical filter and a commercial interference-type optical filter is as shown in FIG. 13. As can be known from FIG. 13, this optical filter has the maximum transmittance of 83%, which is higher than that of the commercial interference-type optical filter (45%). This optical filter has a thickness of 12 μm, which is far smaller than that of the commercial glass optical filter (3.5 mm).

Example 9 Production of Narrowband Optical Filter by Using Dye as Additive of Polymer-Based Nanocomposite Thin Film A narrowband optical filter was obtained by using a dye as an additive of a composite thin film.

In Example 5 and Example 8 described above, MDMO-PPV and P3HT were uniformly dispersed in a precursor/polymer gum solution, to obtain narrowband optical filters Z4# and Z5# having the same effects as those of Example 5 and Example 8.

The production method of Z4# was specifically as follows. MDMO-PPV was uniformly dispersed in the precursor/polymer gum solution in Example 2, and subsequent steps which were exactly the same as those of Example 2 were performed, to obtain an $MA_3Bi_2Br_9$/polymer narrowband optical filter; wherein the content of MDMO-PPV in $MA_3Bi_2Br_9$/polymer was 1 wt %.

The production method of Z5$^\#$ was specifically as follows. P3HT was uniformly dispersed in the precursor/polymer gum solution in Example 3, and subsequent steps which were exactly the same as those of Example 3 were performed, to obtain an MA$_3$In$_2$Cl$_9$/polymer narrowband optical filter; wherein the content of MDMO-PPV in MA$_3$Bi$_2$Br$_9$/polymer was 20 wt %.

P3HT was uniformly dispersed in the precursor/polymer gum solution in Example 3, and subsequent steps which were exactly the same as those of Example 3 were performed, to obtain an MA$_3$In$_2$Cl$_9$/polymer narrowband optical filter, Z6$^\#$, wherein the content of MDMO-PPV in MA$_3$Bi$_2$Br$_9$/polymer was 10 wt %.

Example 10

The continuous adjustabilities of the maximum transmittance and the transmission wavelength may be achieved by controlling the solid content of the semiconductor material in the polymer-based nanocomposite.

Figure 11:
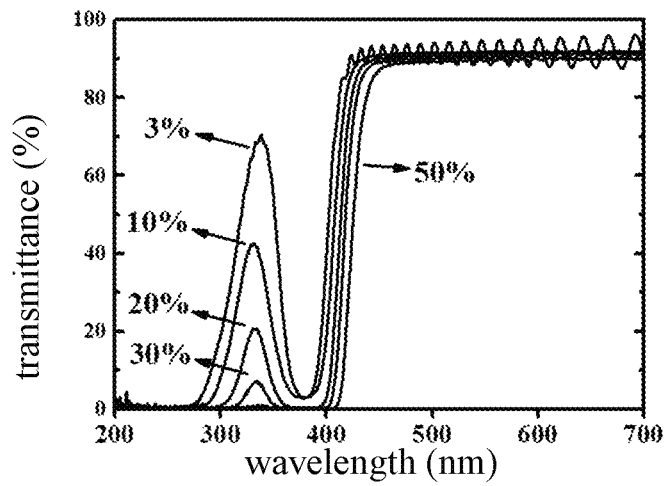
FIG. 11 is a graph of the relationship of the variation of the transmittance with the wavelength for a series of $MA_3Bi_2Br_9$/polymer optical filters having continuous adjustability of transmission wavelength and intensity obtained by controlling the solid content in Example 10 of the present disclosure.

Samples 1$^\#$ to 5$^\#$ MA$_3$Bi$_2$Br$_9$/polymer in Example 1 were produced according to the steps in Example 2, to obtain a group of MA$_3$Bi$_2$Br$_9$/polymer optical filter samples, which were tested for the relationships of the variation of the transmittance with the wavelength, and the results are as shown in FIG. 11. As can be known from the figure, the peak transmittances were adjusted from 70% to less than 1% in a range of 280-370 nm and the long-wave-pass wavebands were adjusted from 400 nm to 425 nm.

Example 11

The continuous adjustabilities of the maximum transmittance and the transmission wavelength may be achieved by controlling the film thickness of the polymer-based nanocomposite thin film.

The sample 1$^\#$ MA$_3$Bi$_2$Br$_9$/polymer (PMMA) obtained in Example 1 was coated on glass plate substrates with wet film thicknesses of 100 µm, 200 µm, 400 µm, and 1000 µm, respectively, which were placed in a vacuum drying oven for vacuum drying at 50° C., followed by annealing at 80° C. for 30 min after complete drying, to obtain a series of MA$_3$Bi$_2$Br$_9$/polymer (PMMA) double-wave-pass optical filters.

Figure 12:
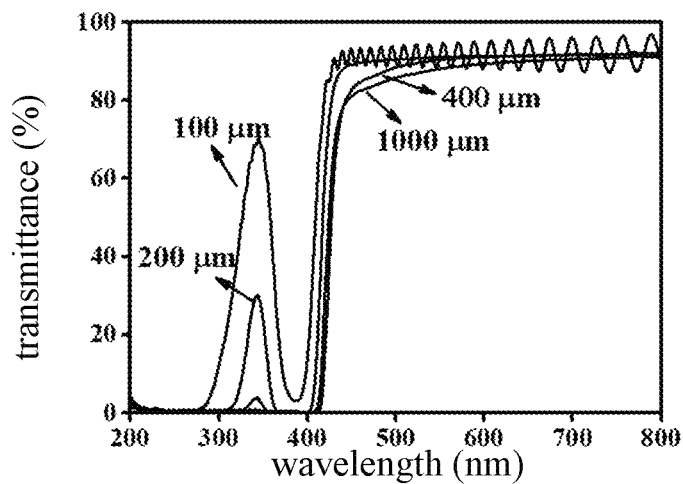
FIG. 12 is a series of $MA_3Bi_2Br_9$/polymer optical filters having continuous adjustability of transmission wavelength and intensity obtained by controlling the film thickness in Example 11 of the present disclosure.

The relationships of the variation of the transmittance with the wavelength for these optical filters are as shown in FIG. 12. The peak transmittances were adjusted from 72% to less than 1% in a range of 280-370 nm and the long-wave-pass wavebands were adjusted from 405 nm to 425 nm.

Example 12 Non-Radiative Recombination of Polymer-Based Nanocomposite

A glass plate was used as a substrate and the surface of the glass plate was cleaned, and a mixed solution, in which the sample 1$^\#$ MA$_3$Bi$_2$Br$_9$/polymer (PMMA) was well dissolved, was coated on the glass plate; a wet film having a thickness of 200 µm (corresponding to a dry film thickness of about 20 µm) was formed by wiping with a film wiper; and the glass plate coated with the wet film was placed in a vacuum drying oven for vacuum drying at 60° C., followed by annealing at 80° C. for 30 min after drying was complete, to obtain a long-wave-pass optical filter based on MA$_3$Bi$_2$Br$_9$/polymer, which was denoted by C6$^\#$.

Figure 15:
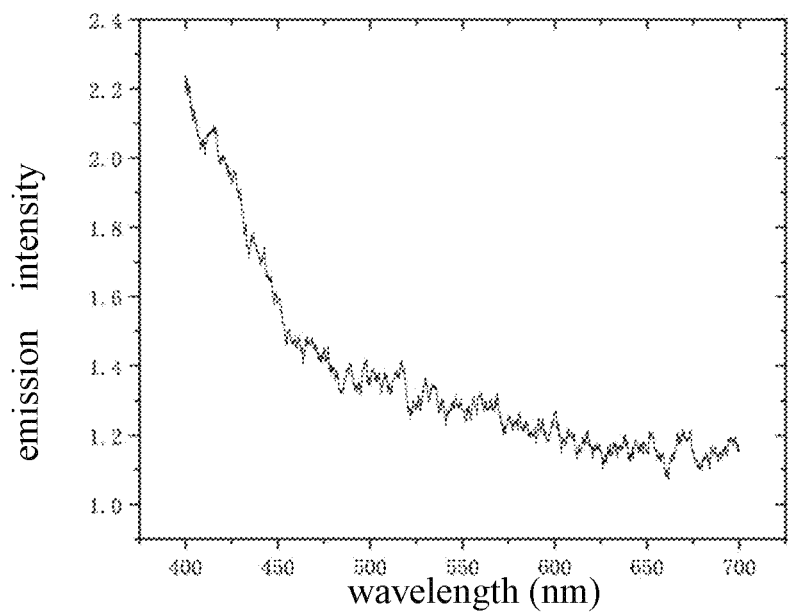
FIG. 15 is a fluorescence spectrum of the composite in Example 12 of the present disclosure.

A fluorescence spectrum of the optical filter was tested, as shown in FIG. 15. As can be seen from the figure, nearly no fluorescence is generated by excitation with ultraviolet. The polymer-based nanocomposite belongs to non-radiative recombination-type semiconductor material.

Example 13 Production of Long-Wave-Pass Optical Filter Based on the Sample 13$^\#$ Cs$_2$SnI$_6$/Polymer A glass plate was used as a substrate and the surface of the glass plate was cleaned, and a mixed solution, in which the sample 13$^\#$ Cs$_2$SnI$_6$/polymer (PAN) was well dissolved, was coated on the glass plate; a wet film having a thickness of 200 µm (corresponding to a dry film thickness of about 20 µm) was formed by wiping with a film wiper; and the glass plate coated with the wet film was placed in a vacuum drying oven for vacuum drying at 60° C., followed by annealing at 60° C. for 30 min after drying was complete, to obtain a long-wave-pass optical filter C13$^\#$ based on Cs$_2$SnI$_6$/polymer.

Figure 16:
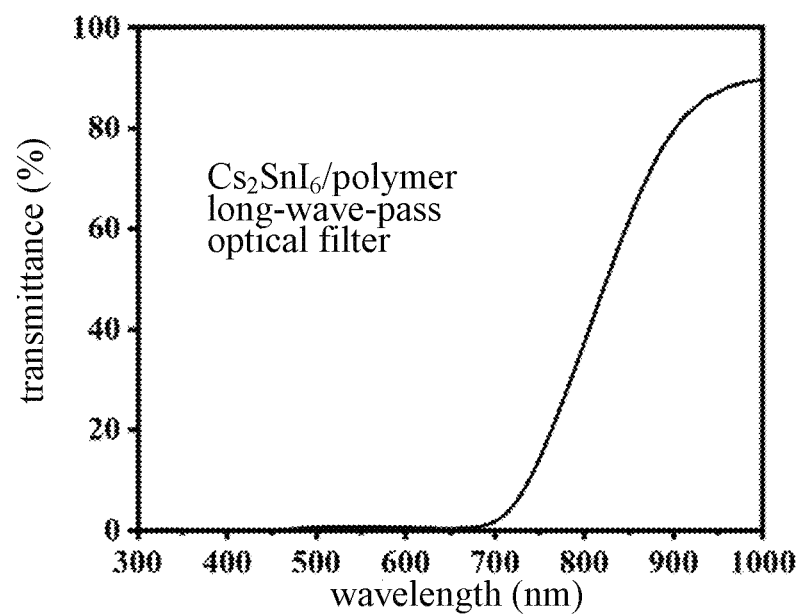
FIG. 16 is a graph of the relationship of the variation of the transmittance with the wavelength for a long-wave-pass optical filter based on a sample 13[#] $Cs_3Sn_2I_9$/polymer in Example 13 of the present disclosure.

The relationship of the variation of the transmittance with the wavelength for this optical filter is as shown in FIG. 16. As can be known from FIG. 16, this optical filter has a transmittance of >90%, a light transmittance of less than 1% in the cut-off wavelength range, and a large cut-off steepness, in a wavelength range of greater than 980 nm.

A thin film of the polymer-based nanocomposite of the present disclosure may have an absorbance of nearly 0 and a transmittance of about 95% in a very long waveband range and has the advantages of good weather resistance and good resistance to chemical reagents, and is an excellent matrix material for absorption-type optical filters. An object of the present disclosure is to overcome the disadvantages of glass optical filters, including bad optical filtering performance and large thickness, and to overcome the disadvantages of interference-type optical filters, including low transmittance in the ultraviolet waveband, high cost, and difficulty in integration.

The above contents are only several Examples of the present disclosure and do not limit the present disclosure in the form. Although preferred Examples are used to disclose the present disclosure as above, they are not intended to limit the present disclosure. Without departing from the scope of the technical solution of the present disclosure, some variations and modifications made by any person skilled in the art using the technique contents disclosed above are all equivalent to equivalent Examples and are all within the scope of the technical solution.

What is claimed is:

1. A polymer-based nanocomposite, wherein components of the polymer-based nanocomposite comprise a polymer matrix and only one perovskite material having non-radiative recombination property; and
   wherein the polymer-based nanocomposite has an average light transmittance of greater than 90% in at least one light-transmitting wavelength range and a light transmittance of less than 1% in at least one cut-off wavelength range,
   wherein the perovskite material has a size of 2-100 nm and has general chemical formula of A$_3$B$_2$X$_9$, and
   wherein A is one of CH$_3$NH3, CH(NH)NH$_3$, and Cs; B is one of Ag, Sb, Bi, In, Al, Ti, and Sn; and X is one of halogen elements.

2. The polymer-based nanocomposite according to claim 1, wherein the polymer-based nanocomposite has an average light transmittance of greater than 90% in at least one light-transmitting wavelength range and a light transmittance of less than 1% in at least one cut-off wavelength range in a range of 3000-200 nm.

3. The polymer-based nanocomposite according to claim 1, wherein a polymer of the polymer matrix is selected from at least one of polyvinylidene fluoride, polyvinylidene chloride, polymethyl methacrylate, polyvinyl acetate, cellulose acetate, polysulfone, polyamide, polyimide, polycarbonate, polystyrene, polyvinyl chloride, polyvinyl alcohol, transparent ABS plastics, polyacrylonitrile, polyolefin elastomers, thermoplastic polyurethane, and polyvinyl carbazole.

4. The polymer-based nanocomposite according to claim 1,
the perovskite material has a solid content of 2 wt %-50 wt %.

5. The polymer-based nanocomposite according to claim 1, wherein the polymer-based nanocomposite further comprises an additive component;
wherein the additive component is selected from at least one of poly(p-phenylenevinylene), poly(3-hexylthiophene), [6,6]-phenyl C61 butyric acid methyl ester, polyvinylcarbazole, perylene diimide, fullerene, and poly[2-methoxy-5-[(3,7-dimethyloctyloxy)-1,4-phenylene]-1,2-vinylene-diyl]; and
wherein the additive component in the polymer-based nanocomposite has a content of 1 wt %-20 wt %.

6. An optical filter based on the polymer-based nanocomposite according to claim 1, wherein production steps of the optical filter comprise at least:
a) dissolving the polymer matrix and a precursor of the perovskite material in organic solvents, respectively, to obtain a polymer gum solution and a precursor solution;
b) adding the precursor solution to the polymer gum solution followed by uniformly mixing, to obtain a mixed solution;
c) coating the mixed solution obtained in step b) on a substrate, to form a film with a wet film thickness of 50-1000 μm; and
d) subjecting the substrate coated with the wet film to drying treatment followed by heat treatment at 20-100° C. for 0.17-1 hour, to obtain the optical filter.

7. The optical filter according to claim 6, wherein the organic solvents in step a) are selected from at least one of N,N-dimethylformamide, dimethylacetamide, dimethyl sulfoxide, ethyl acetate, N-methylpyrrolidone, tetrahydrofuran, toluene, chloroform, and acetone;
wherein the precursor in step a) comprises a precursor I and a precursor II, wherein the precursor I is selected from at least one of methylamine halide, formamidine halide, and cesium halide, the precursor II is selected from at least one of bismuth halide, indium halide, antimony halide, silver halide, and titanium halide, and a molar mixing ratio of the precursor I to the precursor II is in a range of 1:2-3:1;
wherein the substrate in step c) is selected from any of a glass plate and PET; and
wherein the heat treatment in step d) is annealing treatment.

8. The optical filter according to claim 6, wherein the optical filter is a long-wave-pass optical filter or a double-wave-pass optical filter;
wherein the long-wave-pass optical filter has an optical filtering waveband range in a range of 3000 nm-250 nm;
wherein the double-wave-pass optical filter has an optical filtering waveband range including two non-overlapping waveband ranges in a range of 3000 nm-250 nm; and
wherein the long-wave-pass optical filter and the double-wave-pass optical filter have a light transmittance in a range of 80%-92% in a light-transmitting waveband range.

9. A narrowband optical filter, comprising the optical filter of claim 6,
wherein the narrowband optical filter has an optical filtering waveband range in a range of 3000 nm-250 nm and a light transmittance in a range of 80%-92% in a light-transmitting waveband range.

10. The narrowband optical filter according to claim 9, wherein the narrowband optical filter further comprises at least one of a short-wave-pass optical filter and a dye-doped polymer.

* * * * *

UNITED STATES PATENT AND TRADEMARK OFFICE
CERTIFICATE OF CORRECTION

| | | |
|---|---|---|
| PATENT NO. | : 12,332,465 B2 | Page 1 of 1 |
| APPLICATION NO. | : 17/065465 | |
| DATED | : June 17, 2025 | |
| INVENTOR(S) | : Zhong et al. | |

It is certified that error appears in the above-identified patent and that said Letters Patent is hereby corrected as shown below:

On the Title Page

(30) Foreign Application Priority Data: Please insert --Apr. 9, 2018 (CN) 201810309621.6--

Signed and Sealed this
Seventh Day of October, 2025

John A. Squires
*Director of the United States Patent and Trademark Office*